United States Patent [19]

Winter

[11] 3,899,277
[45] Aug. 12, 1975

[54] MOULDING MACHINES
[75] Inventor: Alan William Winter, Cobham, England
[73] Assignee: Bowater Packaging Limited, London, England
[22] Filed: Feb. 8, 1973
[21] Appl. No.: 330,590

[30] Foreign Application Priority Data
Feb. 8, 1972   United Kingdom.............. 5793/72

[52] U.S. Cl. ............. 425/383; 425/126; 425/397; 425/DIG. 38
[51] Int. Cl. ............................. B29c 17/00
[58] Field of Search............ 425/126, 129, DIG. 38, 425/125, 117, 383, 388, 393, 397, 112; 53/215; 264/271, 275, 316; 156/218

[56]   References Cited
UNITED STATES PATENTS
2,941,570   6/1960   Plym.............................. 156/218 X
3,728,799   4/1973   Streltsov....................... 425/383 X
3,780,559   12/1973   Turner........................... 425/129 X FOREIGN PATENTS OR APPLICATIONS
1,010,465   5/1962   United Kingdom
872,578   9/1958   United Kingdom
466,350   11/1935   United Kingdom
364,859   1/1932   United Kingdom
1,013,246   9/1963   United Kingdom
1,806,363   12/1959   Germany
1,237,885   3/1967   Germany
1,043,786   4/1959   Germany Primary Examiner—Francis S. Husar
Assistant Examiner—Carl Rowold
Attorney, Agent, or Firm—Brisebois & Kruger

[57]   ABSTRACT

A transfer arrangement for transferring a blank of sheet material to a former and comprising two movable arms the free ends of which are arranged to wrap the blank around the former, which former may be used as a mandrel for subsequently feeding the blank into a moulding machine.

9 Claims, 5 Drawing Figures

MOULDING MACHINES

This invention relates to apparatus for transferring a blank sheet of material to a former and especially to a moulding machine incorporating such apparatus.

The invention provides apparatus for transferring a blank of sheet material to a former so that the blank assumes the outer peripheral contour of at least part of the former, the apparatus having a pair of arms the free ends of which are arranged, in use, to engage the blank and move arcuately towards each other, the apparatus being such that initially a first part of the blank is brought into engagement with the former and then, as the free ends of the arms approach each other, the remainder of the blank extending in opposite directions from the first part gradually engages the former.

An advantage of this apparatus is that it can be used to transfer a blank of sheet material onto a former of virtually any shape. Furthermore, such apparatus is capable of handling blanks of almost any material, such as cardboard or plastics foils and especially decorative and/or structural blanks which are used to extend partly or wholly around a moulded product such as a container. If the former is of generally frusto-conical configuration and is used, for example, as a mandrel for feeding blanks into the female die of an injection moulding machine, it is difficult, when using conventional equipment, properly to orientate the blank on the former whilst ensuring that the blank is brought into perfect mating engagement with the former. This difficulty is simply and efficiently overcome by the apparatus of the invention since initially a first part of the blank is brought into engagement with the former,- which prevents subsequent movement of the blank away from the former, and then the arms progressively wrap the remainder of the blank around the former.

Preferably, each arm is mounted for pivotal movement. Advantageously, each arm is mounted for pivotal movement about a fixed pivot. Mounting the arms in this way enables the apparatus to be actuated in a particularly simple way. Thus, each arm may be pivotally connected by linkage means to actuating means for effecting arcuate movement.

It is of advantage if the arms are mounted for pivotal movement about a common pivot. If, however, larger blank sizes are contemplated it may be necessary to mount the arms on separate pivots.

Although, of course, the arms can take various forms, for example they may be curved, it is of advantage, especially when the blank is wrapped completely around the former, if each arm is of generally 'L'-shape the former lying within the angle of each L when the arms have completed transfer of the blank thereto. Shaping the arms in this way facilitates wrapping of the blank around the former, especially when the former is a right-cylinder or frusto-conical in shape, and this is enhanced if the free end of each arm extends inwardly relative to the limb of the L on which it is provided.

The blank can be wrapped around the former solely by movement of the arms themselves. However, it is particularly advantageous if the free ends of the arms are straddled by a strip of material which, preferably, is elastic and which ensures, in use, that the blank closely mates with the outer peripheral contour of the former. This feature is particularly useful for blank materials which have a tendency to crease, for example, corrugated cardboard.

The initial engagement of the first part of the blank with the former may be effected by the movement of the arms themselves. However, it is of particular advantage if means, separate from the arms and preferably constituted by one or more fingers, are provided for bringing the first part of the blank into engagement with the former. This ensures that the apparatus can be used for almost any sheet material and, in particular, materials which although flexible in nature have a certain degree of rigidity, for example, cardboard material.

Although the blank of material could be supported on the free ends of the arms prior to transfer it is of advantage if means, separate from the arms and preferably comprising a plate provided with an aperture through which the arms can pass, is provided to support the blank prior to transfer to the former.

The invention also provides a moulding machine comprising a former for receiving a blank of material and feeding the blank to the machine mould and apparatus for transferring the blank to the former according to the invention.

Preferably the former is provided with passages connected to a vacuum pump, the passages being arranged in use to hold the blank in position on the former. These passages provide a simple mechanism for holding the blank on the former after withdrawal of the arms.

The invention further provides a method of feeding a blank of material into the mould of a moulding machine including the step of transferring a blank of material to a former using apparatus according to the invention. Preferably, the method includes the subsequent steps of holding the blank in position in the former, withdrawing the arms, inserting the former into the mould of the moulding machine and releasing the blank from the former.

One form of moulding machine constructed in accordance with the invention will now be described, by way of example only, with reference to the accompanying drawings of which:

Figure 1:
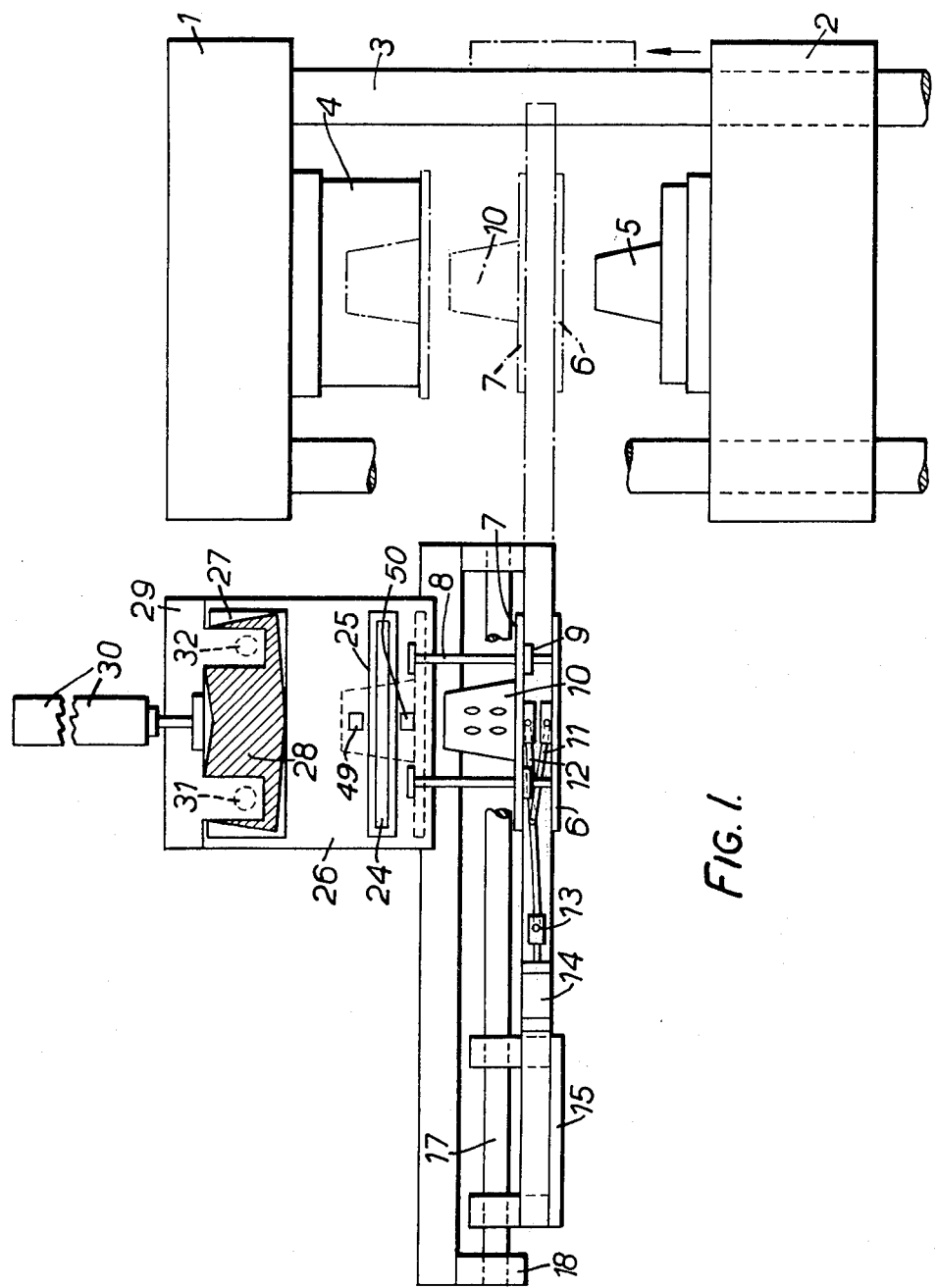
FIG. 1 is a diagrammatic plan view of an injection moulding machine.
Figure 2:
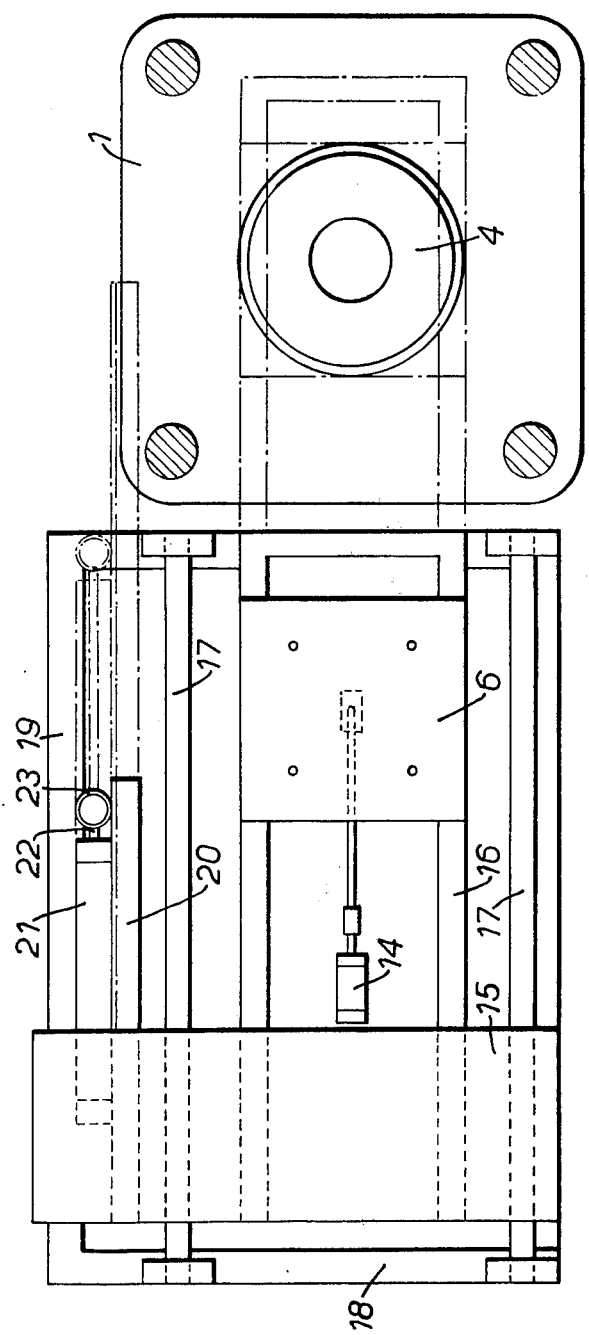
FIG. 2 is a side elevation of the machine shown in FIG. 1.

Referring to FIGS. 1 and 2 the machine comprises a fixed cross-head 1 and a movable cross-head 2 which are connected by tie rods 3 and on which are mounted a female die 4 and a male die 5 respectively. Movable into and out of the region between the moulds 4 and 5 is a mandrel carrier comprising relatively movable plates 6 and 7 connected by four guide rods 8 which are fixed to plate 6 and which pass through bushes 9 provided on the plate 7. The plate 7 carries a mandrel 10 and can be slidably moved along the rods 8 and towards and away from the plate 6 by means of a linkage comprising arms 11 and 12 pivotally connected to the ram 13 of a pneumatic cylinder 14 and pivotally connected to the plates 6 and 7 respectively.

The mandrel carrier also comprises a plate 15 to which the plate 6 is connected by means of a sub-frame member 16 and which is slidably mounted on guide rods 17 secured in a fixed supporting framework 18. The latter carries a rack and pinion assembly comprising a fixed rack 19, a movable rack 20 secured to the plate 15 and a pneumatic cylinder 21 secured to the framework 18. The ram 22 of the cylinder 21 carries a pinion 23 which is rotatable between the racks 19 and 20.

Arranged at one side of the framework 18 is a transfer mechanism indicated generally at 24 and which will be described in more detail below. The transfer mechanism is mounted below an aperture 25 formed in a support plate 26, the latter also being formed with an aperture 27 which serves as the mouth of a magazine holding a stack of blanks one of which 28 can be seen in FIG. 1. A blank carrier 29 is movable towards the transfer assembly and back to the magazine by means of a pneumatic cylinder 30. The carrier 29 is of generally 'U'-shape lying in a plane parallel to the support plate, the ends of each limb of the U being provided with suction pads 31 and 32.

At the beginning of a moulding cycle the parts are in the full line positions indicated in FIG. 1. Firstly, the stack of blanks is lifted by a pneumatic, magazine cylinder (not shown) until the top blank 28 is brought into engagement with the pads 31 and 32. Sub-atmospheric pressure is then applied to these pads and the magazine cylinder is returned leaving the blank 28 attached to the carrier 29. The cylinder 30 is then actuated to move the latter into position over the aperture 25.

At this stage the cylinder 14 is actuated to move the plate 7 away from the plate 6 and along the guide rods 8 until the mandrel 10 is brought into the phantom line position indicated in FIG. 1. Once this has been accomplished the blank is ready for transfer to the mandrel and this operation is set out in detail below. For the moment it will be assumed that the blank has been transferred to the mandrel and is being held thereby and the blank carrier 29 has been returned to its illustrated position by the cylinder 30.

The mandrel carrier cylinder 14 is now actuated again to return the mandrel 10 from the phantom line position to the full line position shown in FIG. 1. The cylinder 21 is then actuated moving the rack 20 into the phantom line position shown in FIG. 2. Since the rack 20 is fixed to the plate 15 the latter is drawn along the guide rods 17 taking with it the sub-frame 16 and the mandrel 10 until they are brought into the phantom line position shown in FIG. 1.

The cylinder 14 is actuated once more to move the plate 7 away from plate 6 so that the mandrel is inserted into the female die 4. As explained below the blank is then released from the mandrel and deposited in the female die whereupon the cylinder 14 is actuated to return the mandrel 10. The cylinder 21 is then actuated to return the rack 20 into its full line position taking with it the sub-frame 16 and the mandrel 10. As soon as the latter has been returned the moving crosshead 2 of the machine is actuated and the male die 5 is inserted into the female die 4. Moulding material is then injected. the product moulded, the movable crosshead 2 returned, and the product ejected. Meanwhile, the cycle described above has been repeated and a new blank is ready to be brought into position between the male and female die.

Figure 3:
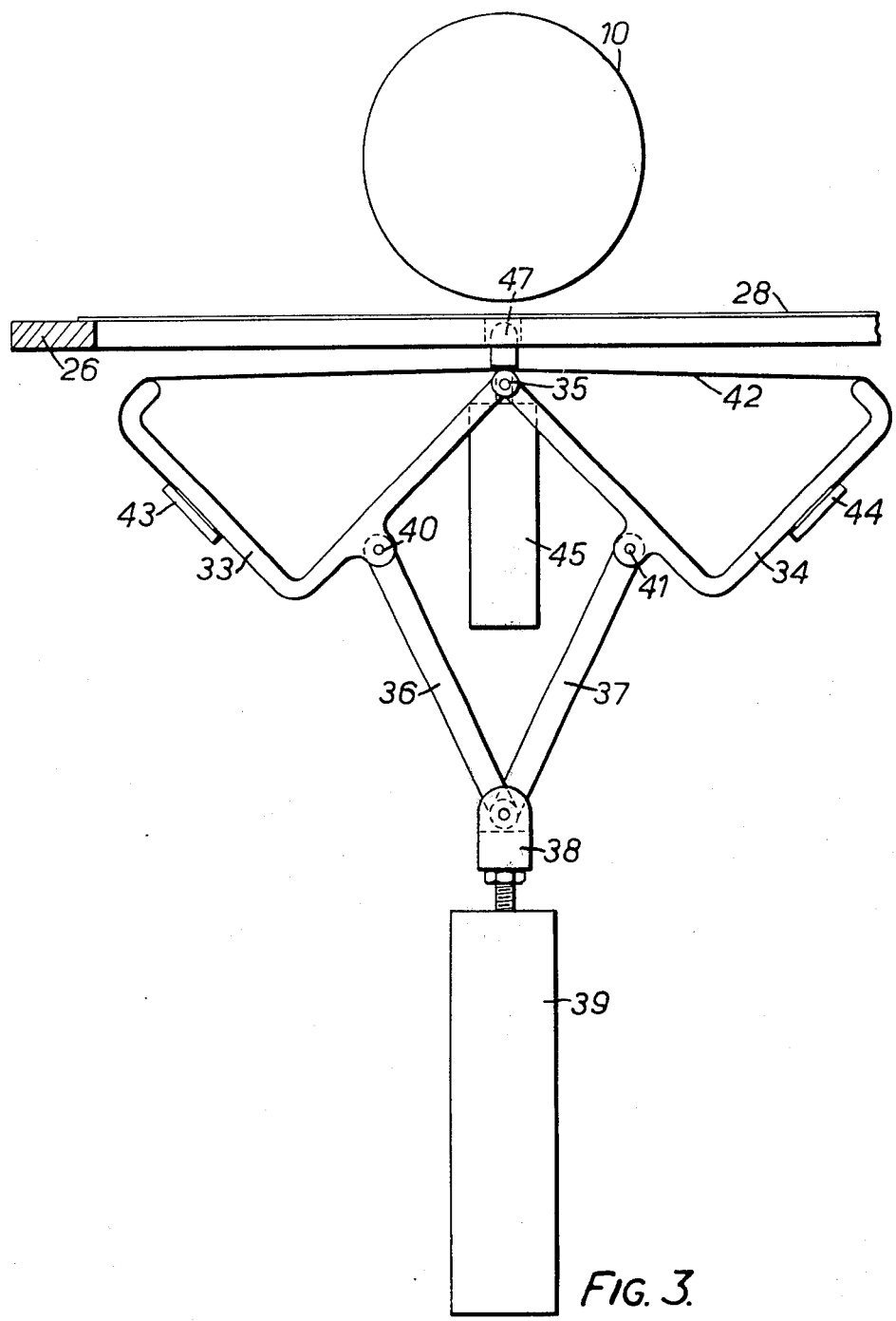
FIG. 3 is an elevation of the transfer mechanism forming part of the moulding machine illustrated in FIGS. 1 and 2 and shown in its non-operative condition.
Figure 4:
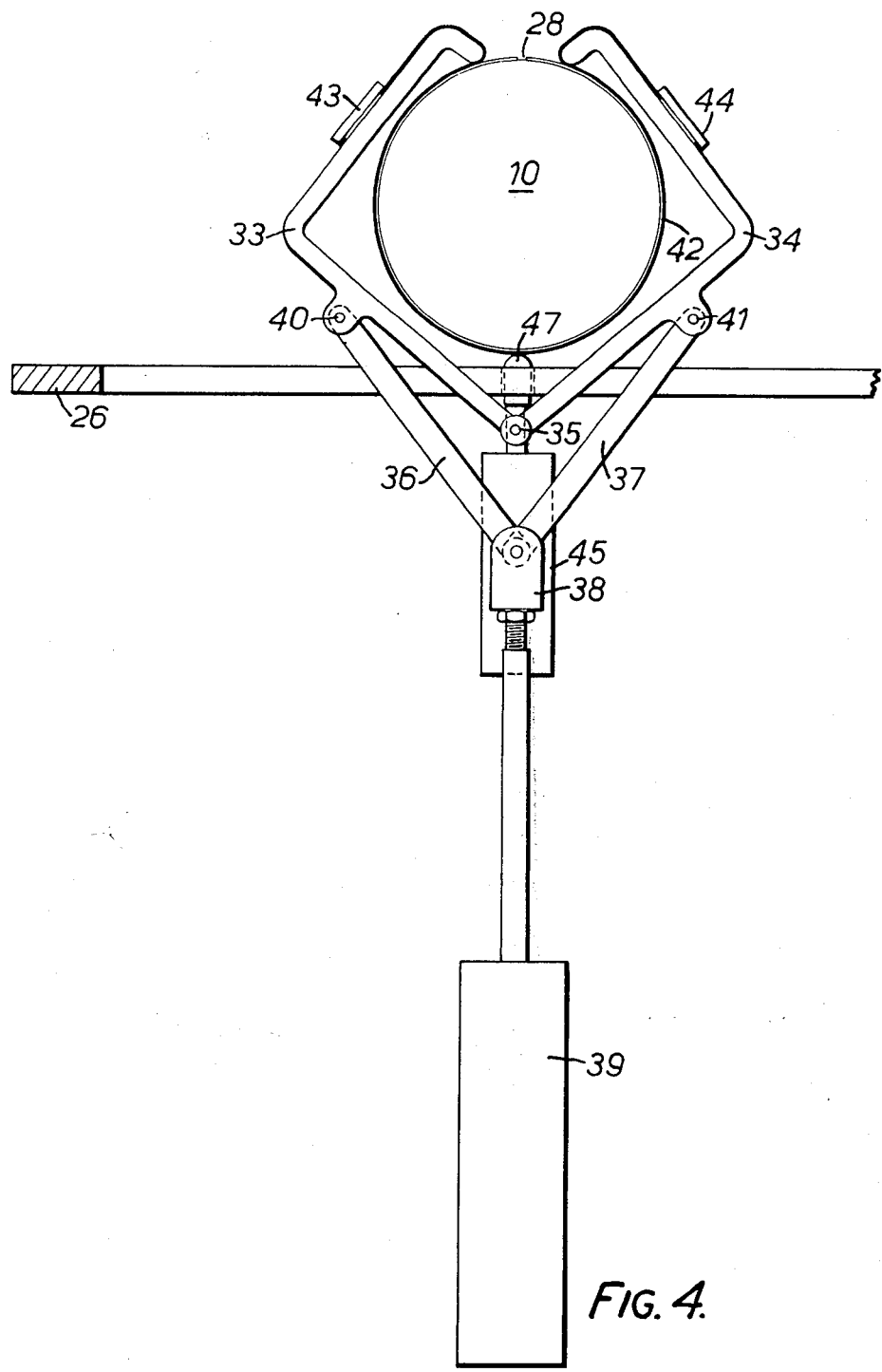
FIG. 4 is an elevation of transfer mechanism illustrated in FIG. 3 shown in its operated condition.
Figure 5:
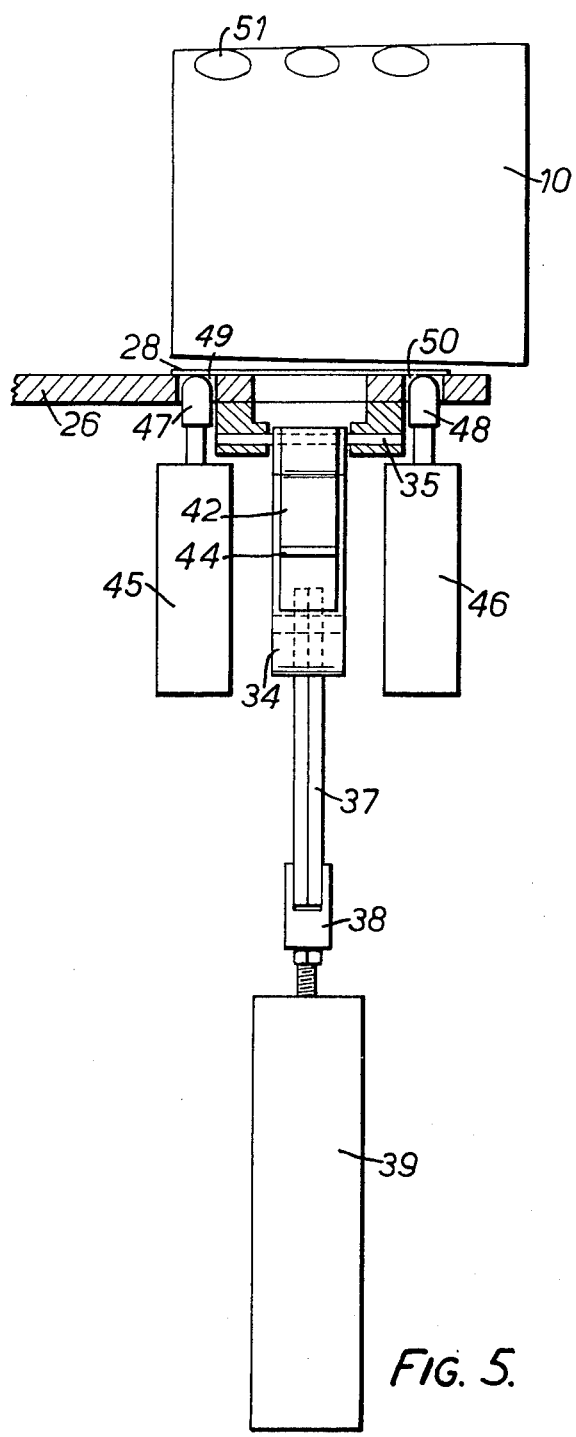
FIG. 5 is an elevation of the transfer mechanism shown in FIG. 3 at right angles to the plane of that figure.

FIGS. 3 to 5 illustrate in more detail the transfer mechanism 24 incorporated in the machine described and illustrated above. Basically, the mechanism comprises a "lazy tongs" type arrangement including two cranked arms 33 and 34 mounted for pivotal movement about a common pivot pin 35. Linkages 36 and 37 are connected at one end to a common point on the ram 38 of a pneumatic cylinder 39, whilst the other ends are connected to pivot points 40 and 41 respectively, arranged intermediate the length of arms 33 and 34. Straddling the free ends of the latter is an elastic band 42 of rubber or other suitable material, the ends of which are held by clamping devices 43 and 44 arranged on the arms 33 and 34 respectively.

Arranged on either side of the arms 33 and 34 are two pneumatic cylinders 45 and 46, the rams 47 and 48 of which pass through apertures 49 and 50, formed in the support plate 26. In FIGS. 3 to 5 the mandrel 10 is shown directly above the transfer mechanism and this corresponds to the phantom line position of the mandrel shown in FIG. 1. The mandrel 10 is formed with air passages 51 connectible to a vacuum pump not shown.

When the blank 28 has been transferred beneath the mandrel 10 by the carrier 29 the blank will be brought into the position shown in FIG. 3. At this time the cylinders 45 and 46 are actuated to pass the finger rams 47 and 48, through the apertures 49 and 50, so that they engage the blank 28 and bring it into contact with the underside of the mandrel 10. Until this step is completed, the blank is maintained in contact with the blank carrier 29, the pressure to the suction pads 31 and 32 then being increased to release the blank whereupon the carrier is returned to the loading position. A further vacuum passage or passages not shown may be provided on the underside of the mandrel 10 which serve together to hold the blank in position. This further passage or passages may be arranged to lie between the rams 47 and 48 or the further passage or passages may be used to replace one of the rams 47 and 48. The cylinder 39 is now actuated to move the ram vertically upwards causing the arms 33 and 34 to move from the position shown in FIG. 3 to the position shown in FIG. 4. During this movement parts of the blank 28 extending in opposite directions from that part initially held in contact with the mandrel by the finger rams 47 and 48 are gradually brought into contact with the mandrel, the elastic band 42 ensuring perfect mating engagement without rucking or wrinkling.

Sub-atmospheric pressure is now applied to the passages 51 thereby holding the ends of the blank firmly against the mandrel. The rams 47 and 48 are withdrawn and the arms 33 and 34 brought back to the position illustrated in FIG. 3. Cam actuated limit switches, not shown, may be provided to determine the extent of movement of the arms 33 and 34 upwards towards the position shown in FIG. 4 and back into the position shown in FIG. 3.

At this stage the mandrel 10 is next moved into alignment with and inserted into the female die 4 of the moulding machine as described and illustrated above. Pressure to the passages 51 is then increased and the mandrel withdrawn from the female die 4 leaving the blank in position therein. After withdrawal of the mandrel, the male die 5 is inserted into the female die and injection moulding is commenced as described above.

When the blank 28 is transferred to the mandrel 10 its opposite end edges are brought into juxtaposition and because the external and internal dimensions of the mandrel and female die respectively are almost identical it remains in this condition after insertion into the female die. During moulding plastics material injected through an aperture, not shown, in the base of the female die extends between these edges to form a rib which serves to bond the edges together.

It will be appreciated that all the pneumatic actuating means described above could be replaced by other suitable devices which may, for example, be hydraulically or electrically operated.

It will be evident also that although the transfer mechanism described and illustrated above has particular application in injection moulding machines it can be used in any moulding machine where the mould is formed by two separable dies. Further, the transfer apparatus is not limited to use in moulding machines and has application wherever it is necessary to transfer a blank to a former so that the blank assumes the shape of the former, for example, in the packaging industry.

I claim:

1. A moulding machine comprising in combination:
   a. a mould cavity
   b. a blank-receiving member, and
   c. transfer means for transferring a blank of sheet material to the said blank-receiving member, wherein the transfer means comprises means for supporting the blank at a small distance from the blank-receiving member, means for holding a first part of the blank against the blank-receiving member and means for wrapping the remainder of the blank around the member so that the blank assumes the outer peripheral contour of at least part of the member, the wrapping means including a pair of pivoted arms, an end of each of which arms is operatively engageable with the blank, the blank-receiving member being provided with means for securing the blank to the member after the blank has been transferred to the member by the transfer means and the member being arranged to enter the mould cavity of the machine with the transferred blank secured to it; and wherein the holding means is movable to displace the said first part of the supported blank through said distance and into engagement with the blank-receiving member, and each arm is mounted for pivotal movement about a fixed pivot, pivotal movement of the arms bringing the said ends of the arms which engage the blank towards each other whereby the remainder of the blank extending is opposite directions from the said first part gradually engages the blank-receiving member.

2. Moulding machine as claimed in claim 1 in which the holding means comprises at least one reciprocable finger.

3. Moulding machine as claimed in claim 1 in which the arms have a common pivot.

4. Moulding machine as claimed in claim 1 in which the said ends of the arms are straddled by a strip of material which ensures that the blank closely mates with the outer peripheral contour of the member.

5. Moulding machine as claimed in claim 4 in which the strip is elastic.

6. Moulding machine as claimed in claim 1 in which each arm is of generally L — shape, the member lying within the angle of the L when the arms have completed transfer of the blank to the member.

7. Moulding machine as claimed in claim 6 in which the said end of each arm extends inwardly relatively to the limb of the L on which it is provided.

8. Moulding machine as claimed in claim 1 in which the support means has releasable securing means for holding the ends of the blank in position when the holding means is actuated.

9. Moulding machine as claimed in claim 8 in which the support means comprises a reciprocable carrier and the securing means is in the form of openings connected to a vacuum pump.

* * * * *